UNITED STATES PATENT OFFICE.

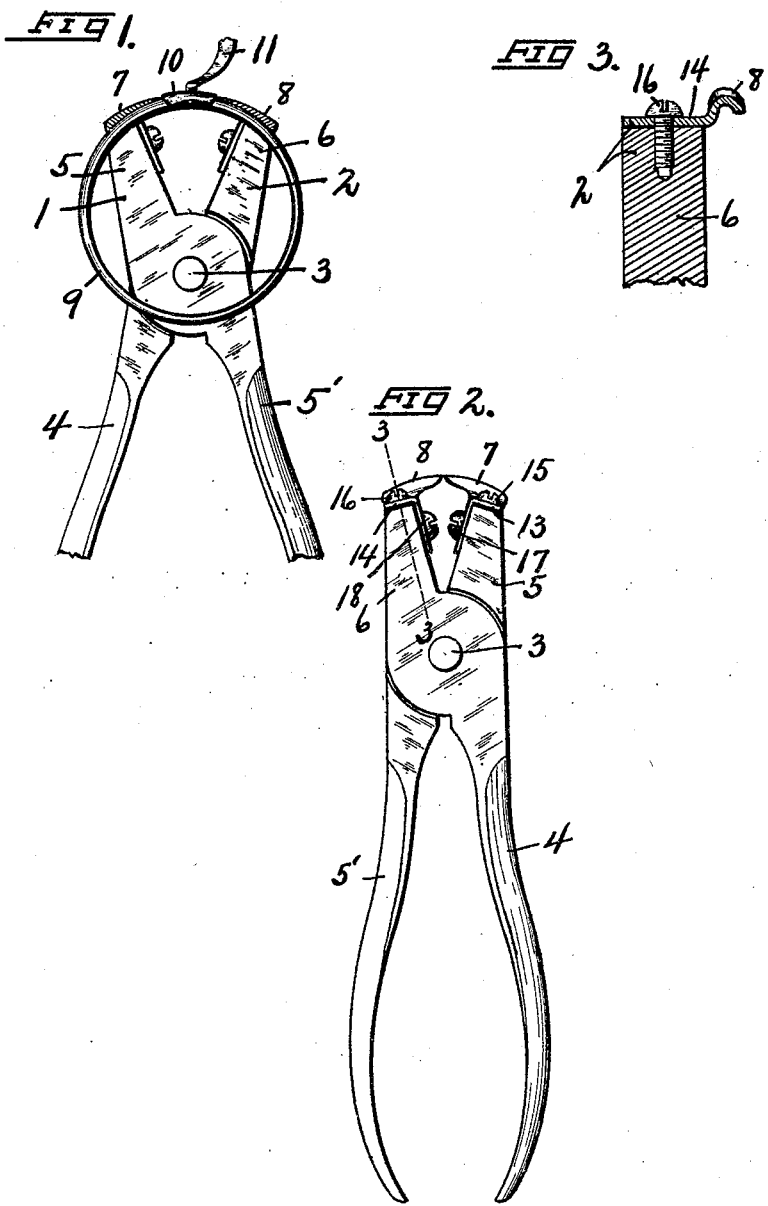

HAROLD J. STEAD, OF GENEVA, NEW YORK.

RIM REMOVER.

1,405,028. Specification of Letters Patent. Patented Jan. 31, 1922.

Application filed July 2, 1919. Serial No. 308,146.

*To all whom it may concern:*

Be it known that I, HAROLD J. STEAD, of Geneva, in the county of Ontario, in the State of New York, have invented new and useful Improvements in Rim Removers, of which the following, taken in connection with the accompanying drawings, is a full, clear, and exact description.

This invention relates to a rim remover and more specifically to a device for removing the rims of spectacles from the rim clamps engaged therewith.

In the manufacture and use of spectacles it is quite common for one to break the rim which carries the lens, particularly when such rims are made of celluloid and light material and often in adjustment and use the bridge of the mounting becomes broken so that it is necessary to separate the rim from the rim clamps to permit substitution and replacement of parts or for repair of the same.

The primary object of my invention is to provide a device, as illustrated, of the plier type particularly efficient for the purpose described.

Other objects relate to the details of form and construction of the device as illustrated.

In the drawings:—

Fig. 1 is an elevation, partly in section, of a device of my invention illustrating the manner of use in separating a lens rim from its rim clamp.

Fig. 2 is an elevation of the same device.

Fig. 3 is a cross section on line 3—3, Fig. 2.

The device as shown comprises a pair of jaws —1— and —2— pivotally connected at —3— for movement toward and from each other as actuated by operating handles —4— and —5—. The jaws, as shown, comprise body portions —5— and —6—, respectively and arcuate shaped rim removing or wedging member —7— and —8— respectively, disposed to one side of the jaws —5— and —6— to permit their reception of a lens rim —9— as illustrated in Fig. 1.

In the ordinary spectacle utilizing a rim —8— of celluloid or light material, the bridge and rim clips are secured to the rim by clamps such as the clamp —10— shown in Fig. 1 as forming a portion of the bridge —11—. These clamps are shaped in cross section to receive the rim and extend around the rim, when bent into engagement therewith a sufficient distance to rigidly grip the same to form a rigid connection. These rims are usually circular in cross section and the clamps are, therefore, usually formed arcuate in cross section and of an extent somewhat greater than a semicircle.

As shown, the wedging parts —7— and —8— are formed in connection with plates —13— and —14— respectively secured to the end of the bodies —5— and —6— of the jaws as by screws —15— and —16— respectively and these plates are preferably provided with flanges extending at an angle to the plates and lie in contact with the interior surface of the bodies of the jaws respectively and secured thereto by screws —17— and —18—. This construction permits removal of the wedging parts of the jaws from the body portions thereof and allows the formation of such wedging portions by stamping and milling or otherwise independent of the remaining portions of the device.

The wedging portions are shaped in lateral cross section to substantially fit the exterior of the rim —9— and their interior surface is curved laterally upon a radius substantially equal to the cross sectional radius of the rim. These wedging parts are curved longitudinally upon a radius approximating the radius of the rim and preferably their interior longitudinal curvature is upon a radius slightly shorter than the radius of the rim so that when the rim is pushed into said parts, its curvature at that portion is slightly changed and the rim contracted to permit insertion of the knife edged front portions of the wedging parts between the rim and the adjacent portions of the rim clamp.

As illustrated the wedging parts may be formed of a metallic sheet of substantially uniform thickness and after stamping or bending to the desired form the interior longitudinal curvature of the wedging parts —7— and —8— may be varied somewhat by milling or otherwise so as to taper the wedging portion longitudinally toward its forward end which has a substantially knife edge. The forward end is beveled somewhat to present a substantial point for insertion between the rim and the rim clamp.

The use of the device will be understood from a consideration of Fig. 1 in which the rim is shown as inserted within the longitudinally and laterally curved wedging parts and the knife points of said parts are presented for insertion between the rim and the adjacent portions of the rim clamp. When this position is attained, movement of the jaws toward each other effected in any suitable way as by the operating handles, will force the wedging parts between the rim and the rim clamp, spreading the latter to substantially its original form and separating the parts thereof, permitting the reuse of either of said parts which may have been in useful condition before such separation.

It will be understood that the device as shown is illustrative of one form of my invention and the detailed description thereof is deemed to describe a preferable construction and that many changes and modifications may be made by way of substitutions and variation in the form and arrangement of the parts and in the details of construction without departing from the invention as set forth in the appended claims.

What I claim is:—

1. A rim remover comprising a pair of jaw bodies having a common pivot, a wedging part carried by each jaw body and disposed laterally to one side thereof, said wedging parts curved laterally and longitudinally and having a substantially knife edge at their adjacent end portions.

2. A rim remover for spectacles comprising a pair of jaws having a common, pivotal axis, said jaws comprising parts extending laterally therefrom, and curved laterally to receive a rim, said parts also curved longitudinally about a center on the side toward the axis of the jaws to substantially conform with the curvature of the rim.

In witness whereof I have hereunto set my hand this 27th day of June, 1919.

HAROLD J. STEAD.

Witnesses:
 HARRY D. MARSHALL,
 E. B. TILDEN.